Patented Jan. 8, 1946

2,392,388

UNITED STATES PATENT OFFICE 2,392,388

ELECTRICAL APPARATUS

Robert M. Joyce, Jr., Marshallton, Del., assignor to E. I. du Pont de Nemours & Company, Wilmington, Del., a corporation of Delaware No Drawing. Application November 5, 1942, Serial No. 464,653

2 Claims. (Cl. 171—252)

This invention relates to electrical equipment and more particularly to improved insulated electrical conductors.

It is well known that copper, which has been cold worked by drawing or other mechanical operations, such as winding a motor armature, has an increased tensile strength but a decreased conductivity compared with soft copper. This loss in conductivity can be restored by annealing at a temperature in the range 200°–325° C. With insulating materials heretofore used, this decrease in conductivity of the copper conductor resulting from the cold working of the insulated conductor during the construction of high quality electrical equipment is particularly disadvantageous because the insulating materials previously used will not withstand the high temperature required to re-anneal the copper conductor in order to restore the conductivity lost in cold working. Although many of the large number of known polymeric and resinous materials possess to a high degree the desired chemical inertness, but few of these materials possess the required electrical properties with certain other physical properties necessary for successful commercial electrical insulation.

It is an object of this invention to provide an insulated electrical conductor which has superior electrical properties, which can be annealed to provide maximum conductivity without separation of the insulation from the conductor or any other damage thereto, and which is totally resistant to stringent oxidizing conditions, to both acids and alkalies, to hydrocarbons and to other organic solvents. A further object is to provide an electrically insulated conductor, which in addition to the above mentioned properties, is capable of being repeatedly flexed at extremely low or high temperatures without breaking the coating or occasioning its separation from the conductor. Other objects will appear hereinafter.

The above objects are accomplished by an electrically insulated conductor in which the insulation is composed of polytetrafluoroethylene.

The polytetrafluoroethylene used in the practice of this invention can be prepared by known methods, for example, by heating tetrafluoroethylene under superatmospheric pressure in the presence of a catalyst, the preferred polymerizing conditions involving a pressure of above 1000 lbs./sq. in., a temperature of from 80°–150° C., and oxygen or an organic peroxygen compound as catalyst, although lower temperatures and pressures are operable with increase in the time of the reaction.

I have found that tetrafluoroethylene polymer can be molded into a coating around wire which is tightly adherent at high as well as at low temperatures; that the insulating and other electrical properties of the polymer are as excellent as its solvent resistance; and that this material possesses further unrealized properties which enhance its value as electrical insulation. Thus I have discovered that in addition to its valuable electrical properties polytetrafluoroethylene coated wire has certain unusual properties which are not apparent from a knowledge of the properties of the polymer alone. Polytetrafluoroethylene possesses essentially no previously known inherent property of adhering to other materials, such as metals. Despite this fact, I have found that the polytetrafluoroethylene coating on wire possesses remarkable coherence to the wire over a very wide range of temperatures. This is particularly unusual in view of the disparity in the coefficients of thermal expansion of polytetrafluoroethylene and of copper. The coefficient of cubical expansion of copper in the temperature range 0°–100° C. is $5 \times 10^{-5}$; that of polytetrafluoroethylene in the temperature range 20°–100° C. is $15 \times 10^{-5}$. Accordingly, it might have been expected that separation of the insulated coating from the copper conductor would take place at high or at very low temperatures, but I have found that such is not the case, even at temperatures ranging from $-78°$ to 300° C.

Also of peculiar importance to the development and success of this invention is my discovery that polytetrafluoroethylene coated wire can be heated in air at a temperature as high as 300° C. without either separation of the coating or dimensional deformation thereof. Because of this unique property of polytetrafluoroethylene coated wire, I am able to overcome the loss of conductivity of the copper resulting from work hardening by annealing the insulated conductor after all mechanical operations on the wire have been performed. This can be accomplished by annealing the insulated conductor at a temperature in the range 200°–400° C. although I prefer the range 225°–300° C. This is not accompanied by any loss of the valuable physical or electrical properties of the polymer. Wires coated with such insulating materials as nylon, cotton, silk, rubber, polystyrene, alkyd resin compositions, or polyvinyl acetal resin compositions such as "Formvar" cannot be subjected to such an annealing operation because separation of insulation from conductor or degradation of the insulation will occur under annealing conditions.

Polytetrafluoroethylene coated wire can be prepared by molding the polymer around the wire at elevated temperature and pressure. This can be carried out by pressing the wire between strips of the polymer at a temperature of 400° C. and a pressure of about 200-500 lbs./sq. in., followed by quenching in water. The coating of the wire can then be trimmed in such a way that a coating of polymer of any desired dimensions is left surrounding the wire. A coating of uniform thickness can be achieved by passing such a sample through a circular die in such a way that a round coating in which the wire is centered is obtained. The polymer can be extruded around a centrally located wire in such a way that a continuous coating on the wire is obtained. Electrical conductors can also be insulated by wrapping with fibers and films of polytetrafluoroethylene.

The invention is further illustrated by the following examples:

Example I

No. 22 copper wire is molded between strips of polytetrafluoroethylene by placing the strips of molded polymer on either side of the wire and pressing at 400° C. under 400 lbs./sq. in., follower by quenching in cold water. The polymer coated wire is then trimmed in such a way as to obtain a wire with a coating of polymer rectangular in cross section. The coating is rendered uniform by passing the wire through centering guides and a circular die so that the corners of the rectangular cross section are cut and a coating having a circular cross section is obtained.

A sample of this coated wire is heated in air at 202° C. for one week. This treatment does not bring about any degradation of the insulation, any loss in pliabiltiy of the insulated conductor, any physical deformation, nor any separation of insulation from the conductor. Similarly, a sample of this coated wire is maintained at −78° C. i solid carbon dioxide-methanol for one week without showing any deleterious effects from either the solvent or the low temperature. Rapid flexing of the coated conductor even at this low temperature does not break the coating or cause it to pull away from the wire.

The complete protection afforded the conductor by this insulation is demonstrated by immersing samples of this coated wire in concentrated nitric acid, concentrated sulfuric acid, concentrated hydrochloric acid, glacial acetic acid, 20% aqueous sodium hydroxide, acetone, methanol, benzene, xylene, and carbon tetrachloride in such a way that the uncoated ends of the wire are not submerged. In no instance is any degradation, swelling, or other apparent effect noted, and in no instance is there observed any tendency for the insulation to separate from the conductor.

Two strands of polytetrafluoroethylene coated wire having a 10 mil coating of polymer are twisted together and connected between the secondary terminals of a Ford spark coil and a spark plug. The spark plug is screwed into a small closed cylinder which contains nitrogen under 100 lbs./sq. in. Dry cell batteries are connected in series to provide direct current at 8 volts to the primary terminals of the spark coil. The resulting secondary current at about 22,000 volts is conducted to the spark plug through the polytetrafluoroethylene insulated wires without breakdown through the insulation. Thus it is seen that conductors insulated with polytetrafluoroethylene have excellent electrical properties in addition to chemical and thermal stability.

Example II

The armature for an electric motor is prepared by insulating the armature slots with strips of molded polytetrafluoroethylene film and the armature is then tightly wound with polytetrafluoroethylene coated wire. It is surprising that the polytetrafluoroethylene coating does not crack when the coated wire is tightly drawn during the wrapping of the armature. The commutator segments of this motor are also insulated from each other with strips of polytetrafluoroethylene film and the commutator V-ring, which separates the commutator segments from the steel supporting member, is likewise pressed from a film of polytetrafluoroethylene. After this assembly is completed, the entire motor is heated to a temperature of 250°-275° C. and then allowed to cool in order to anneal the armature winding, eliminating the adverse effect on its conductivity which was brought about by the cold working which resulted from the tight winding of the armature. The insulation of the armature wire did not fuse together, separate from the wire, or suffer any other adverse effect from this annealing operation. Similarly, the armature slot insulation, the commutator segment insulation, and the commutator V-ring were not affected in any way by this heat treatment.

In a similar manner a soft iron transformer core can be wound with polytetrafluoroethylene coated wire and the coated wire can be annealed to eliminate the cold working effect sustained in winding without any damage to the polytetrafluoroethylene coating. The operation of both the motor and of the transformer after the annealing treatment is perfectly normal with the added advantage of increased efficiency because of the increased conductivity of the annealed copper wire.

Example III

A condenser is prepared by separating two cylindrical brass electrodes 2" in diameter, 1" thick, and having the adjacent faces rounded to a ¼" radius with a sheet of polytetrafluoroethylene 12.5 mils thick. This condenser is employed in a circuit operating with 60 cycle A. C. current at 20,000 volts without any breakdown through the insulating dielectric.

Example IV

A. C. condensers having polytetrafluoroethylene insulating dielectrics are of particular utility in high frequency systems because of their low power factors. A condenser is prepared from two flat brass sheets separated by a polytetrafluoroethylene dielectric 0.1" thick. This condenser is employed in an A. C. circuit at a frequency of 105.1 megacycles. Under these conditions it has a power factor of 0.00025.

Example V

A low capacitance condenser is constructed by separating 15 sheets of .001" aluminum foil with .015" sheet of polytetrafluoroethylene, the alternate aluminum sheets being electrically connected. This condenser conducts a 60 cycle A. C. current of 0.25-0.5 amp. at 4550 volts; no rise in the temperature of the condenser is noted after maintaining this current for twenty minutes. The ability of the condenser to hold a charge is demonstrated by charging it at 135 volts, by means of dry cells. The condenser is then discharged through a sensitive voltmeter. The voltmeter deflection obtained two minutes after charging is almost as great as that obtained immediately after charging.

Although the best results are obtained with pure polytetrafluoroethylene, the insulation can be composed of this polymer in substantial or major amount in admixture with other substances. Examples of suitable fillers are finely divided non-metallic elements such as carbon; inorganic oxides, such as titanium dioxide, lead oxides, silicon dioxide and manganese dioxide; inorganic salts, such as barium sulfate, magnesium carbonate, zinc sulfide and calcium chromate; and other mineral fillers, such as asbestos, powdered mica, powdered fuller's earth, and fiber glass. For certain electrical uses where conduction is required under specific conditions it is advantageous to incorporate finely divided conducting grains or flakes into the polytetrafluoroethylene. Aluminum, copper, silver, graphite, carbon, etc., are most useful.

For example, polytetrafluoroethylene insulated conductors in the form of wire can be used to wind the armatures of motors, especially motors which operate under heavy loads and high temperatures where resistance to oxidation conditions is important. Such insulated wire is particularly useful in winding the armatures of refrigeration motors, where the chemical stability of the insulated wire is necessary since the windings are contacted with chemically active refrigerants, such as sulfur dioxide and ammonia. Because of the fact that large uniform sheets of polytetrafluoroethylene are available, these can advantageously replace built-up mica as insulators for armature slots, commutator segments, and commutator V-rings. These applications are of particular advantage when it is desired subsequently to anneal the motor armature in order to obtain increased conductivity; because of the lack of heat stability of organic binders required in the manufacture of built-up mica, a motor containing this type of insulation cannot be heated to the annealing temperature of copper wire. Polytetrafluoroethylene coated wires can also be employed advantageously in the winding of transformer coils, and of induction coils. Such wires can also be used to advantage as ignition cables for internal combustion engines, particularly for airplanes and tanks, where extreme stability to oxidation, high temperature, and gasoline and lubricating oil is very important and in power and signal transmission. Such insulated wires are also extremely useful for electrical work in chemical plants because of their stability to all kinds of chemical attack.

Submarine and subterranean cables insulated with polytetrafluoroethylene are advantageous in that they have excellent electrical properties, and that the polymer has essentially no tendency to cold flow under the conditions of use. It provides a constant spacing between the conducting elements of the coaxial cables over a long period of time. Another advantage is that the cables are not subject to corrosion by salt water or by subterranean conditions.

Spark plugs, especially for aircraft motors, insulated with polytetrafluoroethylene instead of with mica or porcelain can be employed advantageously because of their resistance to vibration and to sudden shock, because of their excellent electrical properties even at high temperatures, and because the forms or shapes necessary for this type of insulation are readily obtainable by molding polytetrafluoroethylene which is not the case with mica. Sheets of polytetrafluoroethylene are also valuable as storage battery separators.

The insulated conductors of this invention find many electrical applications in radio apparatus, such as spacers, supports, bases and sockets for radio tubes, and particularly as a dielectric for radio, telephone, rectifier and high frequency condensers. Application of this insulation as a condenser dielectric is particularly advantageous especially in frequency modulation transmitters and receivers because of the extremely low power loss of such condensers over a wide range of temperatures and of frequencies, at either high or low humidities. Other uses in which the insulating properties of polytetrafluoroethylene are advantageous include forms for coils and resistors, spreaders and insulators for lead-in wires, and as coupling for high voltage transmitting shafts.

Other applications in which polytetrafluoroethylene is particularly valuable as an electrical insulating material include supports and films in transformers, supports for resistance heating elements, fuse plug windows, washers, bearings, bushings, gaskets, radio transmitting crystal holders, transposition blocks, condenser bases, strain and stand-off insulators, and spacers for coaxial cables.

As many apparently widely different embodiments of this invention may be made without departing from the spirit and scope thereof, it is to be understood that I do not limit myself to the specific embodiments thereof except as defined in the appended claims.

I claim:

1. In the manufacture of electric motors the steps comprising insulating the armature slots with polytetrafluoroethylene, tightly winding the armature thus insulated with wire coated with polytetrafluoroethylene, and then heating the armature thus wound to a temperature of 200° C. to 400° C. to anneal the armature winding and to increase its conductivity.

2. In the manufacture of electric motors, the steps comprising tightly winding the armature with wire coated with polytetrafluoroethylene, and then heating the armature thus wound to a temperature of 200° C. to 400° C. to anneal the armature winding and to increase its conductivity.

ROBERT M. JOYCE, Jr.